US008560269B2

(12) United States Patent
Fischer (10) Patent No.: US 8,560,269 B2
(45) Date of Patent: Oct. 15, 2013

(54) METHOD FOR OUTPUTTING MEASURED VALUES AND DISPLAY DEVICE

(75) Inventor: Helmut Fischer, Oberaegeri (CH)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 480 days.

(21) Appl. No.: 11/664,402

(22) PCT Filed: Sep. 30, 2005

(86) PCT No.: PCT/EP2005/010583
§ 371 (c)(1),
(2), (4) Date: Apr. 9, 2008

(87) PCT Pub. No.: WO2006/034874
PCT Pub. Date: Apr. 6, 2006

(65) Prior Publication Data
US 2008/0262792 A1    Oct. 23, 2008

(30) Foreign Application Priority Data

Sep. 30, 2004 (DE) .......................... 10 2004 048 187
Oct. 27, 2004 (DE) .......................... 10 2004 052 302

(51) Int. Cl.
*G06F 17/18* (2006.01)
*G01N 37/00* (2006.01)

(52) U.S. Cl.
USPC .......................................... 702/179; 702/84

(58) Field of Classification Search
USPC ............................. 702/179, 84; 345/101, 207
See application file for complete search history.

(56) References Cited

U.S. PATENT DOCUMENTS

| 5,291,426 | A | * | 3/1994 | Collins et al. | 702/195 |
|---|---|---|---|---|---|
| 5,633,947 | A | * | 5/1997 | Sibbald | 382/124 |
| 5,930,744 | A | * | 7/1999 | Koch et al. | 702/170 |
| 6,178,390 | B1 | * | 1/2001 | Jun | 702/170 |
| 6,369,820 | B1 | * | 4/2002 | Bertram et al. | 345/440 |
| 6,804,563 | B1 | * | 10/2004 | Lafaye de Micheaux | 700/51 |
| 2002/0022937 | A1 | | 2/2002 | Funakoshi | |
| 2002/0173935 | A1 | | 11/2002 | Miura | |
| 2003/0079160 | A1 | * | 4/2003 | McGee et al. | 714/39 |
| 2003/0228375 | A1 | * | 12/2003 | Yegorova | 424/643 |
| 2004/0115359 | A1 | | 6/2004 | Cebola et al. | |
| 2005/0143935 | A1 | * | 6/2005 | Minor | 702/22 |
| 2005/0206644 | A1 | * | 9/2005 | Kincaid | 345/440 |
| 2006/0061547 | A1 | * | 3/2006 | Bramwell et al. | 345/156 |
| 2006/0282219 | A1 | * | 12/2006 | Proett et al. | 702/11 |

* cited by examiner

*Primary Examiner* — Marc Armand
*Assistant Examiner* — Ricky Ngon
(74) *Attorney, Agent, or Firm* — Kriegsman & Kriegsman (57) ABSTRACT

Method for emitting measuring values on a display (27) for a display device. According to the method, the measuring values that are recorded by a measuring device (24) on at least one test object (11) are forwarded to a signal processing device; a measuring value is detected at each measuring point (14-21) on the test object (11), or a plurality of measuring values are detected at each measuring point (14-21) on the test object (11); the average value is determined at each measuring point (14-21), from the number of detected measuring values; the average values of the respective measuring points (14-21) on at least one test object (11) are sorted according to the rank thereof in an evaluation device including an electronic calculator; and the average values are represented on the display (27) together with an upper and a lower boundary line.

12 Claims, 5 Drawing Sheets

| Individual measurement | Series 1 | Series 2 | Series 3 | Series 4 | Series 5 | Series 6 |
|---|---|---|---|---|---|---|
| 1 | 47 | 55 | 60 | 61 | 52 | 76 |
| 2 | 54 | 59 | 45 | 45 | 47 | 75 |
| 3 | 50 | 62 | 58 | 56 | 58 | 70 |
| 4 | 49 | 70 | 47 | 53 | 52 | 76 |
| 5 | 51 | 71 | 48 | 68 | 64 | 79 |
| 6 | 54 | 90 | 56 | 66 | 68 | 63 |
| 7 | 50 | 88 | 54 | 58 | 73 | 59 |
| 8 | 48 | 69 | 62 | 67 | 67 | 76 |
| 9 | 47 | 69 | 39 | 55 | 67 | 65 |
| 10 | 39 | 65 | 44 | 67 | 69 | 70 |
| Mean value | 48,8 | 69,8 | 51,3 | 59,6 | 61,7 | 70,9 |
| Standard deviation | 4,16 | 11,36 | 7,73 | 7,57 | 8,82 | 6,67 |
| Rank | 1 | 5 | 2 | 3 | 4 | 6 |

METHOD FOR OUTPUTTING MEASURED VALUES AND DISPLAY DEVICE

The subject matter of the invention relates to a method for outputting measured values, in particular in the case of quality inspection, and to a display device.

Carrying out quality control during the production of items such as, for example, the coating of a body with paint and before the delivery of items is of substantial importance for customer satisfaction and, in some instances, also for product safety. Moreover, strict incoming controls of delivered products are carried out in order to ensure that parts corresponding to the requirements for quality and, if appropriate, safety are delivered, and that no bad parts are further processed. Such quality controls must be carried out within a very short time. It is simultaneously necessary to enable a quick statement on the quality of the test item, in order to keep down the costs of quality control. The usual approach is to acquire one or more measured values from a test item that are passed on to be processed and output. The determined data are acquired and output in lists. However, the user cannot recognize simply and quickly whether the acquired measured values correspond to the stipulations with reference to the tolerance bands. There is a need for a complicated individual comparison of the determined values and the required values in order to separate the bad parts from the good parts. This is the case, in particular, with measurement methods in which measurement signals are acquired electronically via measuring devices and are output by a signal acquisition device in a display. Moreover, it is impossible for the individual measured values to be assigned to a measuring point or measuring surface.

It is therefore the object of the invention to provide a method for outputting measured values and a display device for carrying out the method that enables a statement to be made on the quality of the test item(s) immediately after carrying out a number of individual measurements.

This object is achieved according to the invention by the features of claim 1 and 13. Further advantageous embodiments are specified in the further claims.

The inventive method has the advantage of very quickly enabling a qualitative statement on the test item(s). The staff carrying out the inspection can recognize immediately after carrying out a measurement whether the test item(s) or elements of the test items fulfill the various requirements in accordance with the predetermined quality conditions.

After the measurement has been carried out and the measured values have been checked by running through a number of steps, a diagram in which the mean values of individual measurement series are assigned to an axis is output in a display. A first visualization of the measurement results is thereby provided for simple evaluation.

According to an advantageous refinement of the method, it is provided that after being plotted on an axis the mean values are projected onto a straight line. The straight line is formed via an auxiliary axis between a minimum and a maximum mean value, the rank values or the measurement series and/or random samples being plotted on the auxiliary axis. At the same time, the mean values have a ratio to an upper and lower limiting value or limit line. Consequently, it is immediately clear to the staff carrying out the test as to whether a test item fulfills the prescribed requirements, that is to say whether the mean values lie inside, partially outside or outside the limiting values. The representation of the mean values on a straight line enables the recognition of a uniform production by means of a number of juxtaposed mean values. Deviations are likewise plotted by a larger distance of the mean values along the straight line from the next mean value or group of mean values, and are thus immediately recognizable.

It is provided according to an advantageous refinement of the invention that a confidence interval is displayed in relation to each mean value on the straight line plotted according to the rank value or by specification of the measurement series. The confidence interval corresponds, for example, to three times the standard deviation. Consequently, an upper and a lower bound of the confidence interval runs hyperbolically in relation to the straight line on which the rank mean values are plotted. Consequently, in the vicinity of an upper or lower limit line, in particular, it is possible to detect in addition to the desired value or limiting value of the confidence interval the extent to which the individual measurements still lie inside or outside the limiting value or the limit lines. In addition, the confidence interval can be displayed by regression lines.

According to a further advantageous refinement of the invention, it is provided that the measured values of the test item(s) which lie in the limit range of the confidence interval or outside the confidence interval are displayed on the display preferably automatically or upon request from the user by actuating a key on an operator panel. Once a measuring point of a test item lying in the limit range or outside the confidence interval is displayed, the staff can immediately recognize a problem site and institute further measures as appropriate. For example, during ongoing production in which housings or bodies are being painted it becomes possible when measuring a number of elements to detect directly that element which, for example, has an excessively thick or excessively thin layer of paint. It is thereby possible for individual process parameters to be readjusted directly as appropriate while production is running. If what is involved are supply parts that are to be tested, the supplier can be immediately informed of the site or region to be reworked. If the test item comprises only one measuring point and a number of test items have been tested consecutively within a measurement series or random sample and at least one rank value of the mean values lies outside the limit range of the neighboring region or outside the neighboring region, the test item or the element can be determined exactly and rejected, or production can be correspondingly corrected and readjusted. A similar statement holds for measured values that lie outside an upper and a lower limiting value.

According to an advantageous refinement of the method, it is provided that the rank values lying outside the upper and lower limiting value or outside the confidence interval are displayed to the user in the display in a fashion deviating in color and/or shape from the rank values lying inside the confidence interval or the upper and lower limit line. The staff are provided with an additional mode of signaling by the optical highlighting of the rank values, or the individual measured values relevant thereto, lying inside or outside a range. It can advantageously be provided that the rank values lying outside the confidence interval are highlighted by a signaling color, for example red and/or a corresponding background by means of a color and/or hatching, the rank values lying inside the confidence interval or the upper and lower limit lines being identified by a corresponding display, hatching and/or background, for example in a green fashion. An upper and lower limit line can, in addition, be displayed by a third color, hatching or other identification.

According to a further advantageous refinement of the method, it is provided that a scatter of the measured values in relation to the respective mean values is displayed. This scatter is displayed by a bar that extends above and below the mean value and comprises the greatest and least measured value of a measurement series. It is thereby possible to enable a more exact analysis and evaluation. When production whose quality is being optimized bit by bit is underway, it is possible for individual parameters to be inferred more precisely and accessed for setting by enlarging or diminishing such a bar.

The confidence interval or the standard deviation is advantageously set to a predetermined percentage fraction. It is thereby determined which percentage fraction of all the measured values is adopted as a "good part", and which residual percentage fraction lies outside the prescribed tolerance. The confidence interval therefore stipulates a scatter within the mean value that is considered to be permissible.

In a further method step for determining a result, it is provided that each measurement series is checked for a normal distribution of the individual measured values. Such a check establishes whether there are significant differences between the measured values of the measurement series, and so the subsequent steps for evaluating the measurement results are provided with a basis which assumes that each measured value is to be assigned with high probability the mean value of the measurement series.

After a further advantageous step for evaluating the measurement results, it is provided that the homogeneity of the variances of the measurement series is checked. This check and the preceding checks for normal distribution of the measured values of a measurement series can form a precondition as to whether it is possible to carry out a variance analysis or scatter decomposition. In the case of homogeneous variance, that is to say that no significant differences have been determined, it is subsequently possible to carry out a variance analysis in order to form homogeneous subgroups. When significant differences are determined between the mean values, homogeneous groups are formed that are separated into such subgroups by further methods. It is possible by means of such group formation to make a simple statement as to whether the mean values are comparable, that is to say whether upon comparing a number of coated items or systems that apply a layer thickness, comparable layer thicknesses or conditions are found, or whether any adjustment or correction is required.

According to a further advantageous refinement of the method, it is provided that in a further step after the checking of the normal distribution of the measured values and the checking of the homogeneity of the variances a significance test is carried out for the mean values of the individual measurement series or measuring points. The significance is a variable that belongs to the confidence level and enables a statement to be made as to whether the mean values of each measurement series belong to one another. A significance obtains as soon as the condition is fulfilled that $F_{Beob} > F_{tab}$, $F_{Beob}$ resulting from the quotient of the variance II $$S_{II^1} = \frac{\sum (x - xi)^2}{j - 1} n$$

(sum of the mean values of each measurement series in relation to the mean value of all the measurement series as a function of the number of the measurement series) and the variance I $$S_{I^2} = \frac{1}{j} \sum Si^2$$

(sum of the individual squared standard deviations as a function of the number of individual measurements). This significance test, which can be carried out by various methods, serves the purpose of forming homogeneous subgroups. Such mean values that are assigned to a subgroup can be displayed with the same identification and/or color such that the membership of the individual mean values in a group immediately becomes apparent to the viewer.

According to a further advantageous refinement of the method, it is provided that the number of the individual measurements of measuring points of a test item is the same. A balanced evaluation is spoken of given the same number of individual measurements per measuring point on an item. Alternatively, it can be provided that a different number of individual measurements are required per measuring point so that an unbalanced evaluation is spoken of. An unbalanced evaluation is mostly required whenever, for example, a very small surface on a housing is to be tested in conjunction with a large surface on the same housing, and the small surfaces enable only a small number of measuring points.

After the significance test, it is possible to display immediately to the user by outputting mean values that are not significantly different from one another which elements, in particular of different test items, or subregions belong to the corresponding rank values. Furthermore, the significance test can establish which mean values form a subgroup and are, in turn, homogeneous per se. The various subgroups can therefore be used to draw an inference as to which of the parts with the coating lie inside the tolerances, and whether systematic errors may be present.

At the same time, it is possible to establish which elements or product groups require corrections by specifying limits, for example in the sense of the control cards. The gradient of the straight lines on which the mean values are plotted in terms of rank can production engineering. A production method is ideally under control whenever no further significant differences can be demonstrated between the individual elements or subregions. It is thereby possible to eliminate systematic differences between the elements. This means in the case of the checking of layers of paint, for example, that the elements have an area with a layer of paint of the same thickness, taking account of the random samples that, as a rule, do not correspond to the same elements of the individual objects, or partially correspond.

The significance test is preferably carried out in a trial run or a preliminary run before starting up series production. It is thereby possible to optimize the setting of the process for producing an item. Consequently, losses can be prevented when starting up or running series fabrication. The quality class in which the process is to be found is immediately evident to the test staff from the display of the mean values, which are not significantly different from one another, with the same identification or color in a common region along the Y-coordinate. If the mean values are displayed with the same color or in a common region, the process to be checked, the preliminary run for series fabrication or the like is optimally set. If different colors or different areas to which the mean values are assigned are displayed, there is a need for readjustment, it being possible to contribute to raising the process capability by adapting the significantly different mean values, and consequently to minimize the losses.

The object of the invention is achieved by means of a display device as claimed in claim 13. This display device comprises a connection for a measuring apparatus to which a measuring apparatus can be connected in order to carry out individual measurements. The individual measured values are acquired in an evaluation device, provided in the display device and having an electronic computer, and respectively assigned to a measurement series. The evaluation unit uses a number of individual measurements of a measurement series to determine mean values that are output in a fashion projected onto the straight line in a diagram in the case of which the mean values are plotted over an auxiliary axis. The result of the quality inspection is thereby clearly visible to the operating staff or inspection staff.

According to an advantageous refinement of the invention, it is provided that a measuring apparatus designed as a measuring probe and which is provided for measuring the thickness of thin layers is provided at the connection. The layer thickness measurement can be performed, for example, by means of a magneto-inductive method in which, for example, nonmagnetic layers on a ferromagnetic base material are detected, examples being zinc, chromium, copper, tin and/or paint, varnish, plastic, enamel, iron or steel. Likewise, it is possible to carry out the so-called eddy current method in which electrically nonconducting layers on nonferrous metals are determined, such as, for example, paint, varnish or plastic on aluminum, brass or zinc as well as anodized layers on aluminum. The inventive display device is not restricted thereto, and can likewise comprise a measuring apparatus for measuring layer thicknesses using the X-ray fluorescence method or further radiation methods as well as a microhardness measuring system or the like. Further measuring probes or test units for acquiring measured values can likewise be connected to the display device.

According to a further advantageous refinement of the display device, it is provided that a measuring apparatus is integrated in the display device. The measuring apparatus is adapted to the respective measurement task. As a result, a test unit is provided that enables simple handling and qualified pronouncement of the quality of a test item.

The invention and further advantageous refinements and developments of the same are described and explained in more detail below with the aid of the examples illustrated in the drawings. The features to be gathered from the description and the drawings can be applied according to the invention individually per se, or severally in any desired combination. In the drawing.

Figure 1:
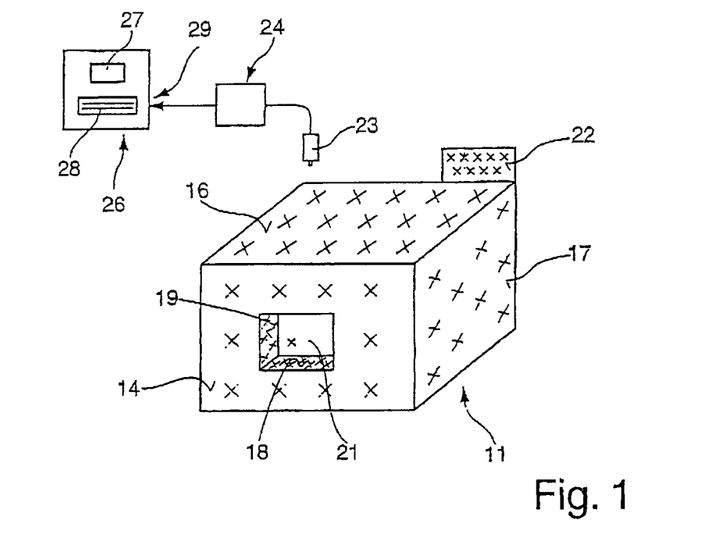
FIG. 1 shows a schematic illustration of a test item.

A test item 11 in the form of a housing is illustrated in FIG. 1, by way of example. This can also be, for example, a body of a water, land or air vehicle, or other items. This test item 11 is, for example, coated, and the quality inspection of this test item 11 requires that a prescribed uniform layer thickness be applied to the test item 11 within a tolerance range. It is provided for the purpose of testing the test item 11 that a number, for example six, of measuring ranges or measuring points are to be monitored. These include a front side 14, a top side 16, a lateral surface 17, a turned edge 18 and 19 in an opening 21, as well as a holding lug 22 on the top side 15. According to a butterfly diagram that encompasses the individual surfaces to be tested, the individual surfaces or measuring ranges are tested one after another in a prescribed sequence. For example, the aim is to carry out ten individual measurements at each measuring point 14, 16, 17, 18, 19, 21 in order to acquire measured values. The measuring points are illustrated by a cross. The individual measurements are carried out with the aid of a measuring probe 23 of a measuring apparatus 24 for measuring layer thickness. It is also possible to carry out the number of individual measurements of a measurement series at the same measuring point. The measuring apparatus 24 is connected via a connection to a display device 26, or in a display device 26 or is integrated in a display device 26, or vice versa. The display device 26 comprises at least one evaluation device with an electronic computer, a display 27 in which the measured values determined from the individual measurements are evaluated, together with the further data in order to assess the quality inspection, and are acquired and displayed in the display 27, and can also be interrogated for various parameters. An operator interface 28 is provided for actuating the display device 26.

Figure 2:
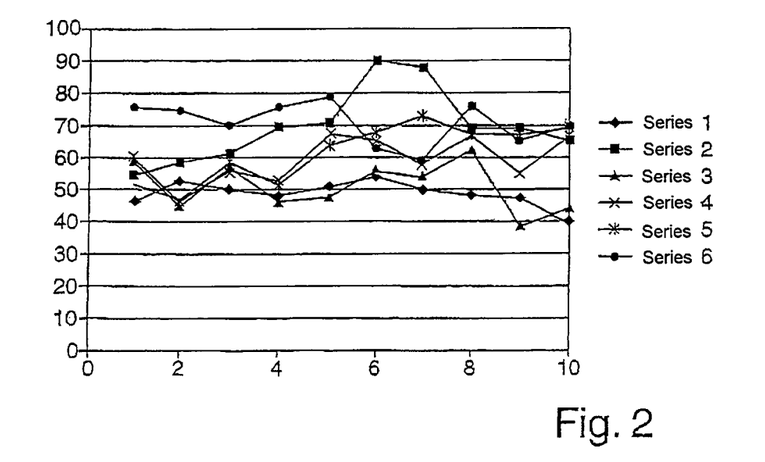
FIG. 2 shows a diagram of acquired measured values from individual measurements.

FIG. 2 illustrates a diagram that can be output in the display 27 on the display device 26 by plotting on the x-axis the number of individual measurements, and on the y-axis the acquired measured values, by way of example, the layer thickness in □m. The measurement series 1 illustrated shows the measurement on the front side 14, the measurement series 2 that on the top side 16, etc.

Figure 3:
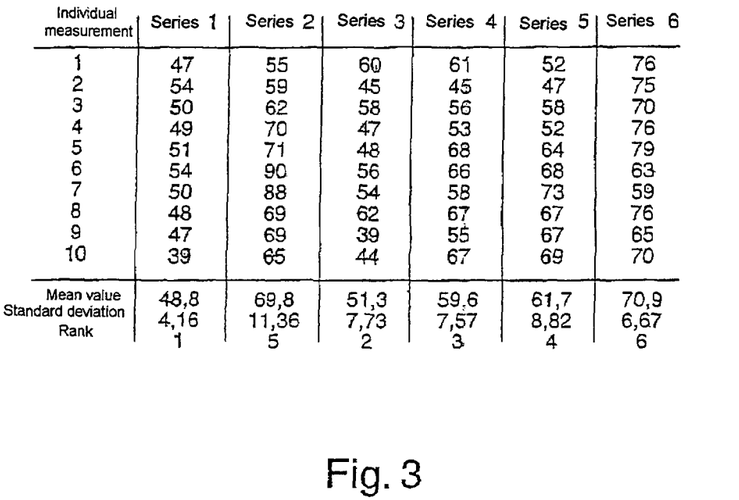
FIG. 3 shows a table of the individual measurements in accordance with FIG. 2.

In FIG. 3, the individual measured values within the measurement series 1 to 6 shown by way of example are assigned in tabular fashion to each measuring point 14 to 21. A test is made in a first step as to whether the measurement series satisfies a normal distribution. The mean value and the associated standard deviation are determined from each measurement series 1 to n. The standard deviation is used to determine whether, for example, rank 1 and rank 2 differ significantly from one another, or whether they do not differ significantly from one another, and can form a homogeneous subgroup. It is preferred to acquire an equal number of measurement values for each measuring point 14 to 21 in order to form the mean values. The determination of rank is thereby based on balanced mean values. Alternatively, the rank values can also be formed from unbalanced mean values. The significance of the deviations is to be evaluated as a function thereof.

Figure 4:
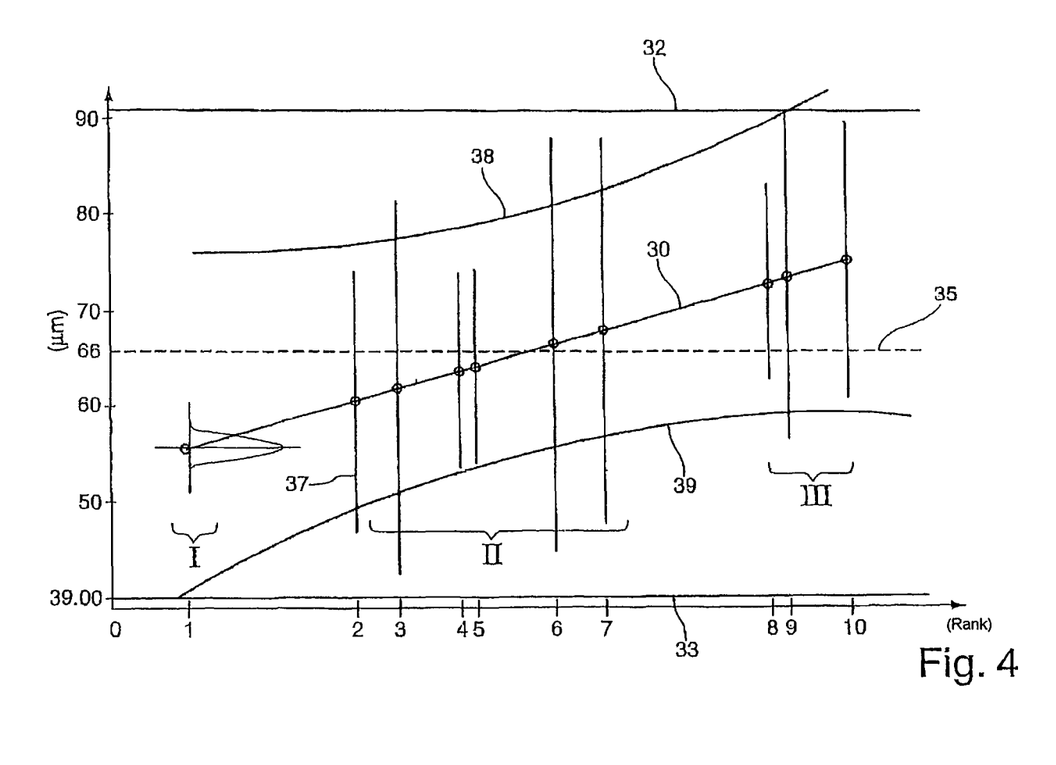
FIG. 4 shows a diagram in which mean values from individual measurements in accordance with FIG. 3 are illustrated according to a rank sequence.

In order to obtain a statement on the quality of the layer thickness on a surface of the test item(s) 11 or of the parameters and/or variables to be tested, in a further step the mean values of the individual measured values at each measuring point 14 to 21 are sorted by rank and projected onto a straight line 30. The highest and the lowest mean value form the starting points for the straight lines 30 extending therebetween. This illustration of a diagram in accordance with FIG. 4 is output in the display 27. The x-axis can show the ranks 1 . . . n, and the y-axis the layer thickness. The x-axis is preferably represented as feature axis, that is to say the number of the measurement series is plotted on it. This enables simple conclusions.

The display 27 also illustrates the upper limiting value 32 and lower limiting value 33 that form a tolerance band relating to a prescribed desired layer thickness in accordance with the characteristic 35. These upper and lower limiting values 32, 33 are a function of stipulations relating to permissible percentage or absolute deviations.

For each mean value, the scatter band of the individual measured values at a measuring point 14 to 21 in relation to the mean value determined therefrom is illustrated by a vertical bar 37. In this case, individual points that form the measured values of a measuring point are illustrated alternately along the bar 37. The bars 37 of the rank values 3 and 7 show that there is a very large scatter band of the individual measurements, which even lie in part outside the confidence interval.

The respective spacing of the individual rank values or of a group of rank values from one another exhibits a high or low uniformity of the layer thicknesses determined at the respective measuring points 14 to 21. For example, the rank value 1 in the range I shows that said rank value deviates clearly from the rank values 2 to 7 in the range II. It is thereby possible to determine directly that the rank value 1 concerns a measuring point that deviates clearly from the remaining ones. The assignment of the individual mean values to the respective subgroup is performed in various ways, depending on the presuppositions. For example, if a normal distribution of the individual measurements obtains for all measurement series, a test is subsequently made for homogeneity of the variances of the individual measurement series. If no significance is established in this test, an unbalanced variance analysis is subsequently performed. If a significance is established by this unbalanced variance analysis, grouping is performed. Subgrouping does not take place otherwise. If the test establishes significant differences in the homogeneity of the variances of the measurement series, a further test is carried out which, in turn, fixes a subgroup upon the establishment of significance.

If at least one measurement series is not normally distributed upon testing all the measurement series for normal distribution, a further test is performed to establish the significance. If significant differences are established in the case of the measurement series, a renewed test is performed for homogeneity in the variances of the measurement series. Subgrouping is carried out using a cross table method subsequent thereto in the case both of establishing significance and of establishing that no significance obtains. Fixing the subgroups enables easier readjustment of individual parameters in the production or establishment of systematic errors in the case of fabricated products.

The measuring point is to be recapitulated by the assignment of the rank value to the mean value and by the assignment of the latter, in turn, to the measurement series, the result being to produce a simple and quick evaluation. It is thereby possible, for example, to determine in a simple way that the front side of the housing has an excessively thin varnish layer, and the varnishing station is consequently set anew.

The range II shows that the rank values are essentially arranged at regular spacings from one another such that there is a high uniformity with reference to the mean value of the layer thicknesses. The mean values can thus be brought into relationship with one another when being assessed and do not differ significantly from one another. It is to be seen from the gradient of the straight line 30 that the mean values all lie within the upper and lower limiting values 32 and 33. The flatter the gradient of the straight line 30, the lower is the tolerance of the mean values among one another relative to the desired value, and the higher is the uniformity of the fabricated products.

If the mean values lie near the desired value and have a flat or vanishing gradient, high quality steps obtain in the production of the test items 11.

By way of example, the normal distribution is additionally illustrated in the case of the rank value 1. This normal distribution is stored for each rank value 1 to n, and can advantageously be interrogated individually. Consequently, the scatter band about the mean value can additionally be illustrated by the normal distribution.

The confidence interval for the individual measured values can form the basis for each midpoint. The confidence interval of the individual values, which exhibits a hyperbolic shape, is illustrated by the characteristics 38, 39. This corresponds, for example, to three times the standard deviation, and is plotted in relation to the respective mean value.

Figure 5A:
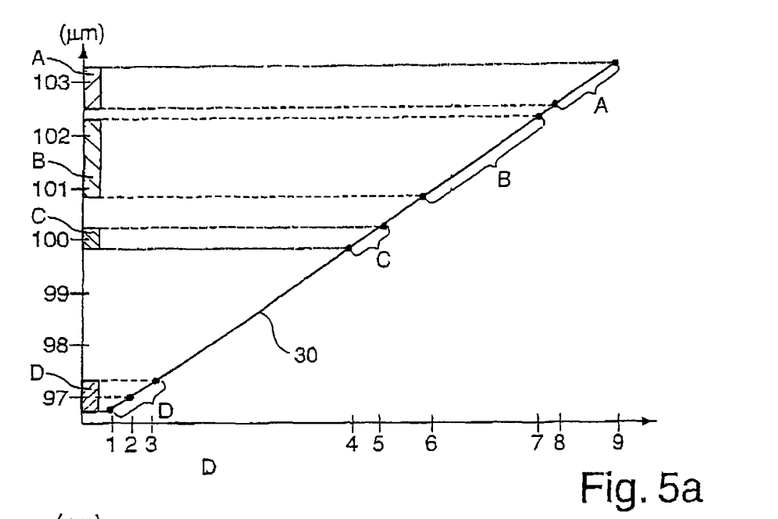
FIG. 5a shows a diagram in which the not significantly different mean values are illustrated by the same identifiers.

FIG. 5a illustrates a diagram in which the mean values not differing significantly from one another are illustrated by the same identifiers A, B, C . . . , etc. For example, the mean values are marked along a straight line by different colors or symbols. It is thereby to be seen that the mean values of the ranks 1 to 3, the mean values of the ranks 4 and 5, the mean values of the ranks 6 and 7 and the mean values of the ranks 8 and 9 do not differ significantly from one another, but that the individual groups A, B, C, D of the rank values differ significantly from one another among themselves. Instead of a colored illustration, it is also possible to use different symbols along the straight line 30. It is provided in accordance with a preferred alternative refinement that a representation in the form of bars is output along the ordinate; it extends over the range of the mean values from mean values that do not differ significantly from one another. Furthermore, it can advantageously be provided that a subgroup mean value is illustrated for the respective subgroup as an orientation aid of the same color as a horizontal straight line, and that the measured value range of the subgroup is output as bars of the same color on the measured value axis. By way of example, four groups A to D are output along the ordinate in FIG. 5a. The operating staff are thus immediately shown that a process is not optimally set. When a process is optimally set, only one identifier, a bar, or only one color is displayed for the rank values.

Such a result in accordance with FIG. 5a can be achieved, for example, for a pre-production fabrication or a preliminary run. In order to raise the process reliability, the ranks 8 and 9 are, for example, controlled downward from the upper range. This means that the process parameters that are responsible for the measuring points on which the mean value of the rank 8 or 9 is based are corrected downward such that, in the example of the measurement of a varnish layer thickness, the measuring points with a smaller varnish layer are provided. When a measurement is carried out once again, it is possible, for example, to obtain therefrom the result in accordance with the display in FIG. 5b. It is clear therefrom that the mean values not differing significantly from one another have been reduced to three subregions B, C, D or three associated elements. The gradient of the straight line 30 is simultaneously reduced. This indicates directly that the process capability has been improved.

Figure 5B:
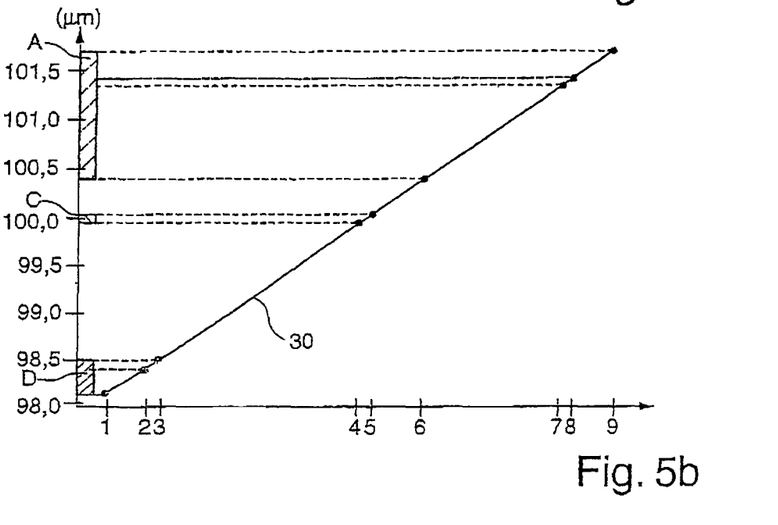
FIG. 5b shows a further diagram in which the not significantly different mean values are reduced.

The ranks 1, 2 and 3 could be raised correspondingly in a next step. This means that the varnish layers there are provided with an increased layer thickness. This systematic approach makes it clear that it is possible to infer exactly the individual process parameters whose causes can be analyzed, and which therefore lead to a quick setting of the process parameters.

Moreover, a statement can be made by means of such a representation as to whether the overall course of the straight line 30 is too high or too low. The representation of the gradient of the straight line 30 and the position thereof relative to the desired mean value enables a quick statement on this.

The display selected in FIGS. 5a and 5b can also be selected for carrying out random samples in order to display which same elements or subregions of different elements or test items comprise individual values not differing significantly from one another. Trends or tendencies in a fabrication cycle that may need to be corrected can thereby be detected.

An overall view of similar elements from their combination is enabled by such displays or, in other words, elements that differ from one another are displayed in an obvious way such that the user can intervene in the fabrication process in a targeted manner and optimize and readjust as appropriate.

Figure 6:
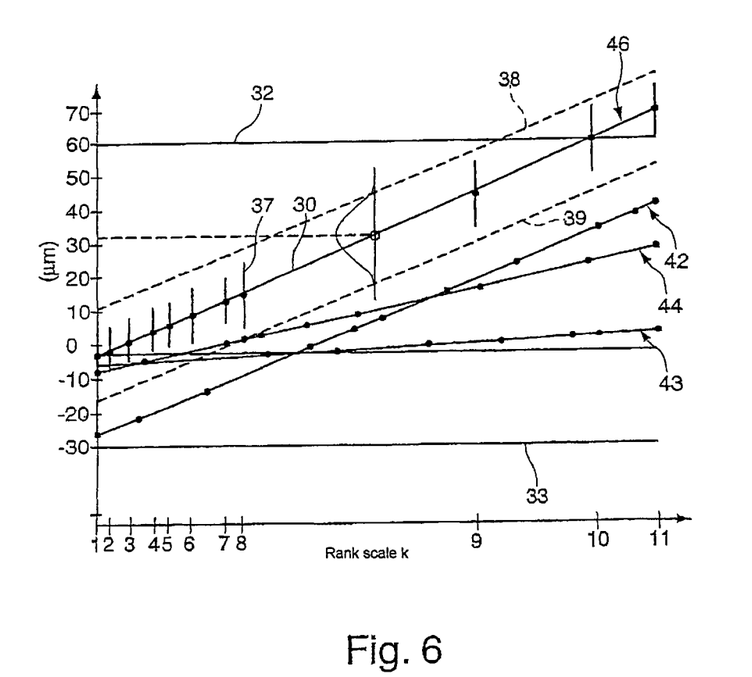
FIG. 6 shows a diagram in which the mean values are illustrated according to rank for a number of test items.

The display in accordance with FIG. 6 shows a diagram in the case of which the characteristic in accordance with FIG. 4 of a number of test items 11 are combined in a diagram and displayed in the display 27. This enables a comparison between different test items 11 as such, always in relation to the respective measuring points. The rank sequence is plotted on the x-axis in the diagram while, other than in the display in accordance with FIG. 4, the y-axis plots a deviation a in μm that results from the actual value determined less the desired value. The zero line corresponds to the desired value in accordance with the characteristic 35 in FIG. 4. Alternatively, the rank axis can also be output as a feature axis or as a neutral auxiliary axis.

This display 27 shows by way of example four characteristics 42, 43, 44 and 46 that respectively display, by way of example, eleven measurement series on four different test items 11. It may be seen from the different courses of the characteristics 42, 43, 44, 46 which test items 11 fulfill the requirements, and which test items or their individual measuring points lie outside the permissible tolerance. The characteristic 43 has a very flat gradient, and therefore comprises only slight deviations in the mean values from the desired value. This characteristic 43, as well as the characteristics 42 and 44, lie respectively within the tolerance between the upper and lower limiting values 32, 33. The characteristic 46 shows that the rank value 10 lies on the upper limiting value 32, and that the rank value 11 lies outside the upper limiting value 32. In the case of the rank value 10, a range of the measured values lies within the tolerance band in terms of the normal distribution, whereas the other half of the confidence interval lies outside the upper limiting value 32.

An item of additional information is that the rank values 10 and 11 are outliers defined as a poor part. It is clear from the display of the scatter band in relation to the mean value that no measured value of the rank 11 lies inside the permissible limit lines 32, 33. The display 27 can be used to infer directly that the test item 11 that leads to a characteristic 43 originates from a supplier who supplies a product of high quality. The test items 11 in accordance with the characteristics 42 and 44 are to be classed as of poorer quality than the test item in accordance with the characteristic 43. However, from a consideration of the confidence interval these are still within the upper and lower limiting values 32, 33. The test item 11 in accordance with the characteristic 46 lies outside the quality range and is classed as a poor part.

A good part can be assumed if the confidence interval that is illustrated by the characteristics 38 and 39 lies within an upper and lower limiting value 32, 33, respectively, in relation to the mean values determined. Such a display 27 enables a quick statement on the product capability that takes account of the individual measurement at one or more measuring points of a product. The product capability is, furthermore, characterized by a parameter $c_p$ that results from a quotient of the tolerance, or the upper and lower limiting values 32, 33, and the confidence interval. An unpredictable process result obtains for characteristic values $c_p<1$. The aim is therefore to attain the characteristic value equal to or greater than one. Process results can then be predicted statistically. This renders it possible to draw specific conclusions concerning causes of error. The aim is preferably a characteristic value of $c_p>3$.

A further quality criterion capable of being derived from the measurement series is the rank alternating frequency of the respective measuring points of similar test items 11. The lower the rank alternating frequency that results from the rank sequences of the mean values for the respective measuring points of a respective test item 11, the more uniform is the quality of the test item 11. It is then possible in the case of coated test items 11 to draw the inference that virtually identical process conditions obtain by means of which specific measuring points of a test item are provided with essentially the same layer thickness.

The output of the values in accordance with FIGS. 4 and 5 on the basis of the preceding formation of the mean values from individual measurements, and of sorting by rank value enables a quick and simple assessment of the respective test item 11.

The inventive method is also used, in particular, for statistical process control. For example, a predetermined number of parts are tested by using random samples within a predetermined time interval.

The test items 11 and the measurement task, or the monitoring, can be applied in completely different fields. For example, time-dependent variations can be acquired at a measuring object. This would be the case, for example, with the action on a coating by UV light or a medium. Such changes in state, or further changes in state can likewise be determined and tested. It is thereby also possible to find an opening for temporal factors in the evaluation in addition to the factors that are purely actually to be measured.

The synchronism of equipment or systems can be tested and monitored as further examples of application. The same holds for the testing of travel paths or repeat accuracies of manipulators, or the precision of automatic mounting processes.

By running a number of consecutive evaluation steps of the individual measurements and of the measurement series of one or more measuring objects, the above-named method illustrates in a very simple way which mean values of the random samples can be compared with one another and thus belong together, and which mean values form individual subgroups that possibly lie outside prescribed tolerances. The associated values relating to the subgroups can easily be verified in order to undertake a correction as appropriate.

All the above-described features are respectively essential per se to the invention, and can be combined with one another at will.

The invention claimed is:

1. A method for outputting measured values in a display of a display device, said method comprising acquiring measured values by a measuring apparatus on one or more test items, wherein the measured values are acquired at a number of measuring points of a test item or a number of measured values are acquired of a number of measuring points on the test item, determining, using an evaluation device that comprises an electronic computer, a mean value for each measuring point from the number of the acquired measured values, sorting, using the evaluation device that comprises the electronic computer, the mean values of the respective measuring points of one or more test items by rank, plotting, using the evaluation device that comprises the electronic computer, a minimum mean value and a maximum mean value in a diagram having an x-axis showing the rank and having a y-axis showing the measured values, forming, using the evaluation device that comprises the electronic computer, a straight line between the minimum mean value and the maximum mean value and plotting, using the evaluation device that comprises the electronic computer, the further mean values onto the straight line via the rank value of the measuring points and displaying an upper and a lower limit line in order to acquire a rank value outside the upper and lower limit line.

2. The method as claimed in claim 1, further comprising displaying a confidence interval in which the mean values are plotted according to rank sequence on the straight line for each mean value.

3. The method as claimed in claim 1, further comprising displaying the measuring points or measured values of the test item or the test items lying in the limit range of a confidence interval or outside the confidence interval on the display.

4. The method as claimed in claim 1, further comprising deviating the rank value in a fashion from at least one rank value lying inside a confidence interval or outside the confidence interval in the display.

5. The method as claimed in claim 1, further comprising displaying a scatter band for the measured values in relation to the respective mean values.

6. The method as claimed in claim 1, further comprising setting a confidence interval to a predetermined percentage fraction.

7. The method as claimed in claim 1, further comprising checking each measurement series for a normal distribution of individual measured values.

8. The method as claimed in claim 1, further comprising checking a homogeneity of the variances of the measurement series.

9. The method as claimed in claim 1, wherein the number of the measured values of each measuring point of a test item is the same.

10. The method as claimed in claim 1, further comprising carrying out a significance test for the mean values of individual elements or measuring points, and displaying the mean values which are not significantly different from one another with the same identification and color in a region along the Y-coordinate or in a fashion projected onto the straight line.

11. The method as claimed in claim 1, further comprising carrying out a significance test of the mean values in a preliminary run before series production.

12. A method for outputting measured values in a display of a display device comprising:

acquiring the measured values by a measuring apparatus on one or more test items, acquiring at a number of measuring points of a test item or a number of measured values of a number of measuring points on the test item, determining, using an evaluation device that comprises an electronic computer, a mean value for each measuring point from the number of the acquired measured values, sorting, using the evaluation device that comprises the electronic computer, the mean values of the respective measuring points of one or more test items by rank, plotting, using the evaluation device that comprises the electronic computer, a minimum mean value and a maximum mean value in a diagram having an x-axis showing the rank and having a y-axis showing the measured values, forming, using the evaluation device that comprises the electronic computer, a straight line between the minimum mean value and the maximum mean value and plotting, using the evaluation device that comprises the electronic computer, the further mean values onto the straight line via the rank value of the measuring points and further comprising carrying out, using the evaluation device that comprises the electronic computer, a significance test for the mean values of individual elements or measuring points, and displaying the mean values which are not significantly different from one another with the same identification and color in a region along the Y-coordinate or projected onto the straight line.

* * * * *